MODULATOR
Filed Dec. 29, 1950
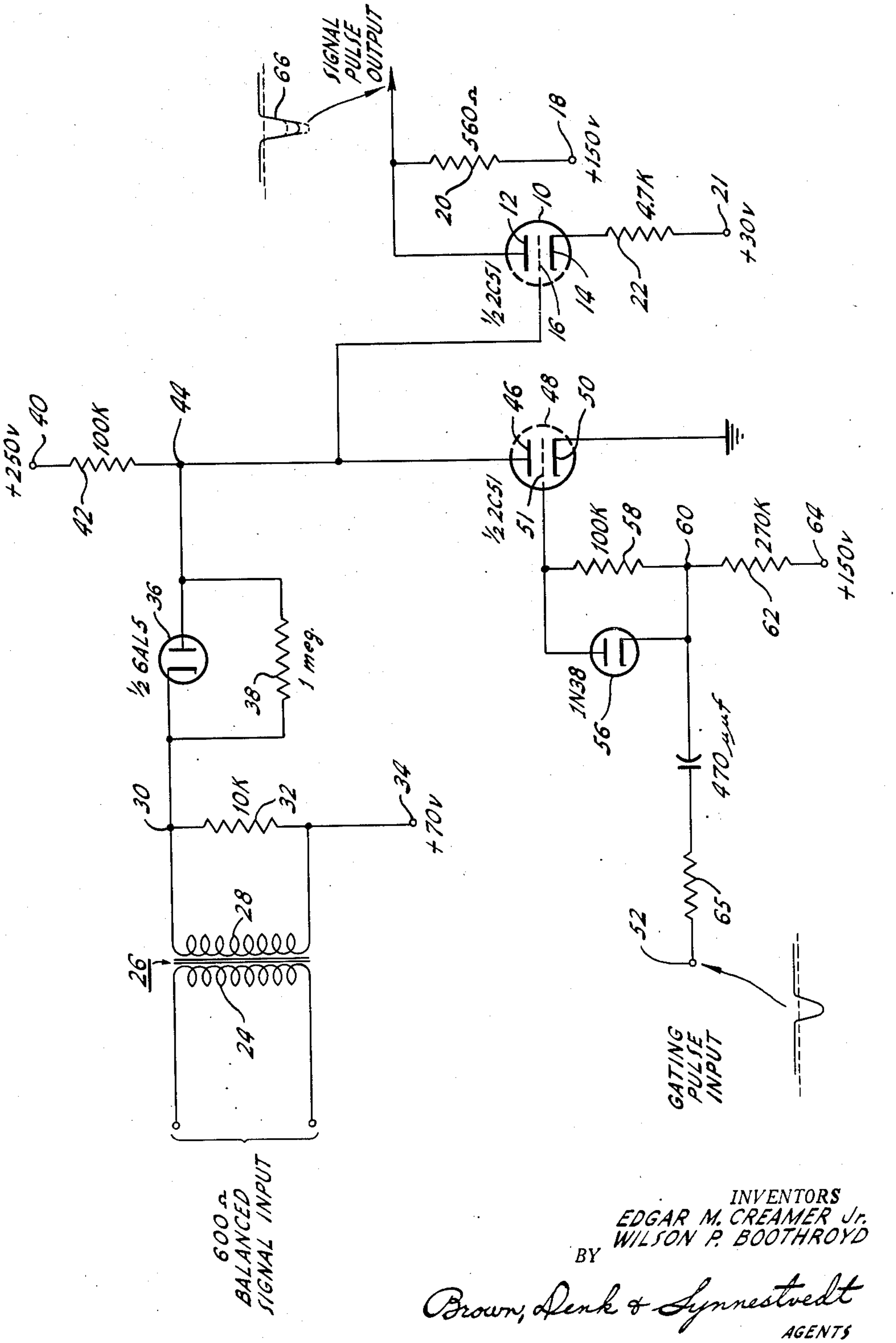
INVENTORS
EDGAR M. CREAMER Jr.
WILSON P. BOOTHROYD
BY
Brown, Denk & Synnestvedt
AGENTS Patented June 17, 1952

2,601,096

UNITED STATES PATENT OFFICE 2,601,096

MODULATOR

Edgar M. Creamer, Jr., Philadelphia, and Wilson P. Boothroyd, Huntingdon Valley, Pa., assignors to Philco Corporation, Philadelphia, Pa., a corporation of Pennsylvania Application December 29, 1950, Serial No. 203,353

8 Claims. (Cl. 250—27)

The present invention relates to modulating circuits, especially as employed in multi-channel communication systems of the pulse-amplitude-modulation type.

In a copending application of the present applicants, Serial No. 70,953 filed January 14, 1949, there is disclosed a time-division multiplex system of communication suitable for television, FM programs, and other high-frequency uses. In accordance with a principal feature of the invention set forth in this copending application, a plurality of intelligence signal channels are each sampled at a rate dependent upon the highest frequency contained therein. This sampling process detects the instantaneous amplitude of the signal in each channel, and, by sampling the channels in sequence, the channel information is made available for interleaving into a composite multiplexed signal.

The apparatus for carrying out this sampling process may, for example, include a pulse generator feeding an artificial delay line. The pulse from the generator is preferably of triangular waveform, and has a recurrence frequency equal to the desired sampling frequency. The delay line is provided with a plurality of output terminals, equal at least to the number of intelligence signal channels, and having a predetermined time delay therebetween. At each output terminal of the delay line, therefore, there is available a properly-timed sampling pulse of the same shape which may be used to control the sampling of a particular intelligence channel.

This sampling is preferably accomplished by employing the sampling pulses derived from each of the above-mentioned output terminals to gate on a normally non-conductive electron tube incorporated in each intelligence signal channel of the system. In such an arrangement, the intelligence signal in each channel is continuously applied to its respective gating tube, but the latter is rendered conductive only upon the application thereto of one particular timing, or gating, pulse from the delay line. The output of each gating tube is consequently a pulse having an amplitude representative of the amplitude of one particular intelligence signal at the instant when sampling occurs. The outputs of these gating tubes are combined, in timed sequence, to form a composite multiplexed signal which may then either be transmitted directly or employed to selectively amplitude-modulate or frequency-modulate a carrier wave for transmission by any suitable form of translating device.

From the above, it will be seen that each modulating unit includes a gating tube which not only receives signals from one of the intelligence channels but also a timing pulse from a tap on the delay network. It is accordingly the purpose of each modulator to act as a gating device which selectively connects a continuously energized intelligence signal circuit to a common transmitter in accordance with the application to the modulator of one of the timing pulses from the delay network. It will now be appreciated that each modulator, or gating circuit, must be closed to its respective intelligence signal channel at all times except when it is opened by the application thereto of a particular timing pulse.

In copending application Serial No. 70,953 above referred to, the gating tube employed in each modulator is a pentode to the control grid of which the intelligence signals are applied. The timing pulses from the delay network are applied to the suppressor grid of the pentode, so that the latter is gated open by the timing pulses to develop in its anode circuit a voltage representative of the amplitude of the intelligence signal for the duration of the gating pulse. Such a circuit arrangement, however, not only requires a manual linearity control for satisfactory operation, but in addition is capable of selectively low output current changes.

In accordance with a feature of the present invention, the modulating circuit described above is modified so as to include a double triode in place of the pentode. The changes provide output pulses of high amplitude and excellent linearity while maintaining freedom from width modulation. In addition, the manual linearity control required in the pentode circuit of the copending application may be omitted. Furthermore, it has been found in practice that a modulator operating in the manner set forth herein is almost completely free from crosstalk between channels resulting from signal "leakage" through a particular cut-off modulator tube during the time periods when other channels are being sampled.

One object of the present invention, therefore, is to provide a modulating circuit especially suitable for use in multi-channel communication systems of the pulse-amplitude-modulation type.

Another object of the present invention is to provide a modulator which includes a triode gating tube, the grid bias and grid signal conditions of the latter being so controlled that substantially no signal leakage through the inter-electrode capacities of the tube can occur.

Other objects and advantages will be apparent from the following description and from the drawing, the single figure of which is a schematic diagram of a preferred form of modulator designed in accordance with the present invention.

The circuit of the drawing includes a triode gating tube 10 having an anode 12, a cathode 14, and a control electrode 16. Tube 10 may, for example, be one section of a 2C51. Its anode 12 is supplied with positive operating potential from a source 18 of, say, +150 volts through a load resistor 20. The latter may be common to a number of other gating tubes when the arrangement of the drawing constitutes one modulating unit of a multiplex transmitter. The cathode 14 of tube 10 is connected to a source of positive potential 21, which may have a value, for example, of +30 volts, through a resistor 22.

The primary winding 24 of a transformer 26 receives intelligence signals from a suitable source having an output impedance of, say, 600 ohms. As shown in the drawing, these audio signals are balanced to ground, and act to produce across the secondary winding 28 of the transformer a varying voltage at point 30. When the modulator of the drawing is employed in a multiplex communication system such as set forth in the copending application above mentioned, the intelligence signals applied to the transformer 26 are developed by a microphone, or other transducer, and are continuously supplied across the primary winding 24.

A resistor 32, terminating the secondary winding 28 of transformer 26, is connected between the point 30 and a source of positive potential (having a value of +70 volts, for example) connected to the terminal 34. The parallel combination of a diode 36 and a resistor 38 joins the point 30 to an additional source of positive potential connected to the terminal 40 through a still further impedance 42. Thus the diode 36 would normally be conductive to establish at point 44 a potential substantially equal to the value of the potential source 34, or +70 volts.

The grid 16 of the gating triode 10 is connected both to the point 44 and to the anode 46 of a further triode 48. The latter may also constitute one section of a 2C51 tube, so that the two units 10 and 48 may, if desired, be contained in a single envelope. The cathode 50 of tube 48 is grounded directly as shown. Since point 44 is at positive potential, tube 48 is normally conductive (assuming a positive voltage also on its control grid 51) to bring its anode 46 and grid 16 of tube 10 down to a value below +30 volts (in the example given). Since this value is less than that of the source to which the cathode 14 of tube 10 is connected, the effect of this lowered potential on grid 16 is to cut off triode 10, and the latter will remain cut off as long as tube 48 conducts.

During this time, of course, intelligence signals are being received by the transformer 26. However, conduction of tube 48, and the resultant lowering of the positive potential at point 44, has caused the diode 36 also to cut off. Hence, any intelligence signals which reach the grid 16 of tube 10 during this period of operation must do so through the relatively high resistor 38. These intelligence signals arriving at point 44, however, now see in effect a parallel impedance network consisting of the plate resistance of tube 48 and the relatively low resistor 42. The signal is divided by passing through resistor 38 and the parallel combination of the high resistance of tube 48 and resistor 42 by a factor of some 30 to 40 db. Thus, during the time tube 10 is nonconducting, the signal reaching its grid is attenuated some 30 db below the normal operating conditions. This 30 db of attenuation then adds directly to the attenuation which would be encountered in feeding from the control grid to the output circuit through the tube capacity. This attenuation is normally on the order of 40 db. The resultant attenuation, then, is between 70 and 80 db, a figure more than satisfactory for commercial operation.

When a negative gating pulse from some suitable source (such as the delay line in applicants' copending application) is received at the terminal 52, it reaches the control electrode 51 of tube 48 through the parallel combination of a diode 56 and a resistor 58. Diode 56 is normally cut off, in the absence of such a negative gating pulse, by having its cathode connected to a point 60 between resistor 58 and one end of a further resistor 62. The remaining end of resistor 62 is connected to the terminal 64 of a source of positive potential having a value, for example, of +150 volts. Consequently, grid 51 of tube 48 is normally at a positive potential, and is only driven negative by the presence of a gating pulse at terminal 52. Where the illustrated modulator forms one unit of a multiplex transmitter, a "padding" resistor 65 may be incorporated in each such unit to equalize the amplitude of the various gating pulses.

As soon as tube 48 is cut off, its anode 46, as well as the grid 16 of gating tube 10, are pulled positive toward the relatively high voltage at terminal 40. When the point 44 exceeds a value of approximately +70 volts, however, diode 36 conducts to stabilize the voltage of grid 16 at this figure. However, this reference, or base, voltage established by conduction of diode 36 fluctuates as a result of variations in the intelligence signal which is applied to the primary winding 24 of transformer 26, and which appears across the resistor 32. However, this intelligence signal voltage "swing" at point 30 (which may be in the order of 20 volts peak-to-peak) is considerably less than the base, or reference, voltage, and hence the signal applied to grid 16 of tube 10 during the period when tube 48 is cut off is always of positive polarity. The resultant pulse in the output of tube 10 may be as shown by the reference numeral 66, the dotted lines indicating the modulation limits. The high reference voltage which may be established at point 44 during the conduction of tube 10 permits the latter to be driven at a high level so as to produce high-amplitude output pulses.

Linearity of pulse output from tube 10 is assured by the presence of the cathode resistor 22. This resistor is un-bypassed to the potential source 21, and hence a negative feedback voltage is developed across it during conduction of tube 10. This negative feedback action tends to stabilize the current in the tube output circuit and reduce any tendency toward amplitude distortion of the signal pulses 66.

While the invention has been set forth in connection with a pulse-amplitude-modulated multiplex communication system, it will be understood that the concept is applicable to any system in which a gating tube is employed to transfer a continuously present signal to an output circuit at the particular time when a gating, or triggering, pulse is also present. As brought out above, the invention is especially suitable for arrangements in which it is essential to avoid any crosstalk between a plurality of channels due to signal leakage through the inter-electrode capacitances of triode modulator tube, as well as where it is desired that optimum operation be achieved without the necessity of employing manual linearity controls.

Having thus described our invention, we claim:

1. In a pulse-amplitude-modulation system, a source of intelligence signals, a first normally non-conductive electron discharge tube having an input electrode to which intelligence signals from said source may be continuously applied, a biasing circuit, including a second normally conductive electron discharge tube, connecting the input electrode of said first tube to a point of constant potential, the impedance between such constant potential point and the input electrode of said first tube being predetermined at a relatively low value when said second tube is conductive, a source of negative gating pulses, and means for applying a negative gating pulse from said source to said second tube to render the latter non-conductive and reduce the bias on said first tube, whereby the impedance between the input electrode of said first tube and said constant potential point is raised above said predetermined value.

2. The combination of claim 1, in which the impedance between the input electrode of said first tube and said constant potential point when said second tube is conductive is chosen to be sufficiently low with reference to the input-output inter-electrode capacitance of said first tube so that the intelligence signals which may be continuously applied to the tube control electrode are substantially completely prevented from being conducted through said inter-electrode capacitance to the tube output circuit.

3. In combination, a triode modulator tube, a diode and a resistor connected in parallel relation, a circuit for connecting the control electrode of said triode modulator tube to a positive reference potential point through the parallel combination of said diode and said resistor, a source of intelligence signals, means for applying intelligence signals from said source to the control electrode of said triode modulator tube through the parallel combination of said diode and said resistor in such a manner that said intelligence signals vary about said positive reference potential level, a connection between the control electrode of said triode and a further source of positive potential of higher value than said reference potential, a normally conductive gating tube, and means for connecting the control electrode of said triode to ground through said normally conductive gating tube, whereby the conduction of said gating tube causes both said diode and said triode modulator tube to be non-conductive and establishes a relatively low impedance between ground and the control electrode of said modulator tube insofar as such impedance is presented to the said intelligence signals.

4. The combination of claim 3, further comprising a source of negative gating pulses, and means for applying a negative gating pulse from said source to said normally conductive gating tube, thereby to cut-off the latter, render both said diode and said triode modulator tube conductive, and raise the impedance between ground and the control electrode of said triode modulator tube as presented to the said intelligence signals.

5. In a modulator for intermittently gating a substantially continuous intelligence signal into an output circuit to yield a series of discrete pulses, the amplitudes of which are dependent upon the instantaneous amplitude of said intelligence signal, a modulator tube having an input circuit and an output circuit, means included in the input circuit of said modulator tube for varying the bias applied to said tube to render it controllable conductive and non-conductive, said last-named means inherently producing a relatively low impedance in shunt with said input circuit when said tube is rendered non-conductive, means for providing a signal path for supplying said intelligence signal to the input circuit of said modulator tube, and means controlled by said bias-varying means for varying the impedance of said last-named means from a relatively low value when said modulator tube is conductive to a substantially higher value when said modulator tube is non-conductive.

6. A modulator according to claim 5 in which said means for varying the impedance of said signal path is operative to vary said impedance from a relatively low value when said modulator tube is conductive to a value substantially higher than the impedance produced in shunt with the input circuit of said modulator tube when said modulator tube is rendered non-conductive.

7. A modulator according to claim 5 in which said means for varying the impedance of said signal path comprises the parallel combination of a resistor and a unilaterally conductive device and means including said bias-varying means for rendering said unilaterally conductive device non-conductive when said modulator tube is non-conductive.

8. In a modulator for intermittently gating a substantially continuous intelligence signal into an output circuit to yield a series of discrete pulses, the amplitudes of which are dependent upon the instantaneous amplitude of said intelligence signal, a modulator tube having at least triode elements, means for varying the bias applied to said tube to render it controllable conductive and non-conductive, said last-named means comprising a vacuum tube having at least triode elements and a load impedance for said last-named tube serially connected between points of different potential and a connection from the junction between said last-named tube and said impedance to the grid of said modulator tube, a unilaterally conductive device connected between said last-named junction and a point of fixed potential intermediate the potentials of said two first-named points, and means including said unilaterally conductive device for supplying said intelligence signal to the grid of said modulator tube.

EDGAR M. CREAMER, Jr.
WILSON P. BOOTHROYD.

REFERENCES CITED

The following references are of record in the file of this patent:

UNITED STATES PATENTS

| Number | Name | Date |
|---|---|---|
| 2,476,959 | Chatterjea et al. | July 26, 1949 |
| 2,562,305 | Ellsworth et al. | July 31, 1951 |